(12) United States Patent
Chen et al.

(10) Patent No.: US 8,010,503 B1
(45) Date of Patent: *Aug. 30, 2011

(54) SYSTEM AND METHOD FOR RESTORING A SINGLE DATA STREAM FILE FROM A SNAPSHOT

(75) Inventors: Raymond C. Chen, Campbell, CA (US); Kayuri Patel, Cupertino, CA (US); Vijayan Rajan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/650,768

(22) Filed: Jan. 8, 2007

Related U.S. Application Data

(63) Continuation of application No. 10/393,781, filed on Mar. 21, 2003, now Pat. No. 7,165,079, which is a continuation-in-part of application No. 09/891,159, filed on Jun. 25, 2001, now Pat. No. 6,643,654.

(51) Int. Cl.
*G06F 17/30* (2006.01)
(52) U.S. Cl. .................................... 707/679; 707/674
(58) Field of Classification Search .................. 707/202, 707/200, 100, 101, 201, 204, 679, 674
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,963,962 A | 10/1999 | Hitz et al. | |
| 5,987,506 A | 11/1999 | Carter et al. | |
| 6,026,474 A | 2/2000 | Carter et al. | |
| 6,038,570 A | 3/2000 | Hitz et al. | |
| 6,065,037 A | 5/2000 | Hitz et al. | |

(Continued)

OTHER PUBLICATIONS

"Complaint for Patent Infringement and Demand for Jury Trial", filed Sep. 5, 2007 in United States District Court for the Eastern District of Texas, Lufkin Division. Civil Action No. 9:07CV206, 18 pages.

(Continued)

*Primary Examiner* — Mahesh Dwivedi
(74) *Attorney, Agent, or Firm* — Cesari and McKenna, LLP

(57) ABSTRACT

A method for restoring a file which has been deleted from a data storage system is described. A set of twin pointers is created by copying from the latest pointers in the active file system at a time of restoration. A new set of pointers is created. A pointer from the twin pointers is compared with a pointer from a snapshot of the active file system made at a time earlier than the deletion of the file. In response to a pointer from the snapshot pointing to a different data block than the pointer from the twin pointers, writing the snapshot pointer into the new set of pointers. Writing the new set of pointers into the active file system at the time of restoration to restore the file to the active file system.

14 Claims, 12 Drawing Sheets

U.S. PATENT DOCUMENTS

| | | | |
|---|---|---|---|
| 6,144,999 A | 11/2000 | Khalidi et al. | |
| 6,151,683 A | 11/2000 | Wookey | |
| 6,178,483 B1 | 1/2001 | Runaldue et al. | |
| 6,230,200 B1 | 5/2001 | Forecast et al. | |
| 6,289,356 B1* | 9/2001 | Hitz et al. | 707/201 |
| 6,425,035 B2 | 7/2002 | Hoese et al. | |
| 6,453,325 B1* | 9/2002 | Cabrera et al. | 707/204 |
| 6,487,561 B1* | 11/2002 | Ofek et al. | 707/204 |
| 6,496,899 B1 | 12/2002 | DeMoney | |
| 6,556,998 B1 | 4/2003 | Mukherjee et al. | |
| 6,594,674 B1 | 7/2003 | Kaplan et al. | |
| 6,751,635 B1 | 6/2004 | Chen et al. | |
| 6,789,094 B2 | 9/2004 | Rudoff et al. | |
| 6,895,416 B2* | 5/2005 | Gara et al. | 707/204 |
| 7,051,050 B2* | 5/2006 | Chen et al. | 707/200 |
| 7,076,509 B1 | 7/2006 | Chen et al. | |
| 7,165,079 B1 | 1/2007 | Chen et al. | |
| 2002/0112022 A1 | 8/2002 | Kazar et al. | |
| 2002/0116593 A1 | 8/2002 | Kazar et al. | |
| 2002/0154645 A1 | 10/2002 | Hu et al. | |
| 2003/0126247 A1 | 7/2003 | Strasser et al. | |
| 2003/0182301 A1 | 9/2003 | Patterson et al. | |
| 2005/0033757 A1 | 2/2005 | Greenblatt et al. | |

OTHER PUBLICATIONS

"Defendant Sun Microsystems, Inc.'s Answer and Counterclaim to Plaintiff Network Appliance, Inc.'s Complain for Patent Infringement", filed Oct. 25, 2007 in United States District Court for the Eastern District of Texas, Lufkin Division. Civil Action No. 9:07CV206, 64 pages.

"Network Appliance's Reply to Sun's Answer and Counterclaims", filed Dec. 7, 2007 in United States District Court for the Northern District of California, San Francisco Division. Case No. 3:07-CV-06053-EDL, 39 pages.

Defendant-Counterclaim Plaintiff Sun Microsystems, Inc.'s Preliminary Invalidity Contentions and Accompanying Document Production for U.S. Patent No. 7,162,486, no filing date listed, filed in United States District Court for the Northern District of California, San Francisco Division. Case No. 3:07-CV-06053-EDL, 61 pages.

SNIA Storage Network Industry Association: Common Internet File System (CIFS), Version: CIFS-Spec. 0.9. Draft SNIA CIFS Work Group Work-in-Progress.

Sheth et al., Data Structure Distribution and Multi-Threading of Linux File System to Multiprocessors, High Performance Computing, 1998, HIPC '98 5$^{th}$ International Conference On, Dec. 17-20, 1998, pp. 97-104.

Hsaio et al., Performance Evaluation of Cache Depot on CC-NUMA Multiprocessors, Parallel and Distributed Systems, 1998, Proceedings, 1998, International Conference on, Dec. 14-16, 1998, pp. 519-526.

Brewer et al., The Evolution of the HP/Convex Exemplar, Compcon '97, Proceedings, IEEE, Feb. 23-26, 1997, pp. 81-86.

Akyurek, Sedat, Placing Replicated Data to Reduce Seek Delays, Department of Computer Science, University of Maryland, UMIACS-TR-91-121, CS-TR-2746, Aug. 1991.

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File System, ACM Trans. Computer System, 6(1), Feb. 1988 pp. 51-81.

Kazar, Michael Leon, Synchronization and Caching Issues in the Andrew File System, Carnegie Mellon University, CMU-ITC-88-063.

Kazar, Michael L., et al., Decorum File System Architectural Overview, USENIX Summer COnference, Anaheim, California, 1990.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168 , Feb. 1988.

Kistler, et al., Disconnected Operation in the Code File System, ACM Transactions on Computer Systems, vol. 10, No. 1, Feb. 1992, pp. 3-25.

Lorie, Raymond, A. Physical Integrity in a Large Segmented Database, ACM Trans. Syst., vol. 2, Mar. 1977, pp. 91-104.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in Computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering And Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

David Hitz et al. TR3002 File System Design for a NFS File Server Appliance published by Network Appliance, Inc.

Fielding et al. (1999) Request for Comments (RFC) 2616, HTTP/1.1.

Rudoff et al., U.S. Appl. No. 60/220,796 titled "API for Extended Attributes", filed Jul. 25, 2000, 13 pages.
Ritchie et al., "The Unix Time-Sharing System", published in Communication of the ACM, vol. 17, No. 7, dated Jul. 1974, 11 pages.
Sweeney et al. "Scalability in the XFS File System", published by Silicon Graphics, Inc., presented at USENIX conference, Jan. 1996, retrieved from http://oss.sgi.com/projects/xfs_usenix/index.html, 19 pages.
Samba for IRIX Installation and Administration Guide, published by Silicon Graphics, Inc., revised Oct. 2004, 20 pages.
Sweeney, Adam, "64 Bit File Access", published by Silicon Graphics, Oct. 7, 1993, 9 pages.
Anderson et al., "xFS Project Architecture", published by Silicon Graphics, Oct. 8, 1993, 15 pages.
Anderson, Curtis, xFS Attribute Manager Design, published by Silicon Graphics, Oct. 7, 1993, 15 pages.
Sweeney, Adam, "xFS Block Zeroing Mechanism", published by Silicon Graphics, Aug. 2, 1994, 6 pages.
XFS Detailed Design—Directory Structures, published Apr. 13, 1994, 12 pages.
Sweeney, Adam, "xFS In-core Inode Management", published by Silicon Graphics, Nov. 29, 1993, 8 pages.
Nishimoto, Michael, "Log Manager Design", published by Silicon Graphics, Dec. 17, 1993, 11 pages.
Nishimoto, Michael, "The Log Manager (xLM)", published by Silicon Graphics, Mar. 28, 1994, 10 pages.
Doucette, Doug, "xFS Message System Design", published by Silicon Graphics, Oct. 7, 1993, 5 pages.
Anderson, Curtis, "xFS NameSpace Manager Design", published by Silicon Graphics, Oct. 7, 1993, 12 pages.
Doucette, Doug, "xFS Project Description", published by Silicon Graphics, Oct. 7, 1993, 5 pages.
Sweeney, Adam, "xFS Superblock Management", published by Silicon Graphics, Dec. 10, 1993, 4 pages.
Doucette, Doug, "xFS Simulation Environment", published by Silicon Graphics, Oct. 7, 1993, 4 pages.
Doucette, Doug, "xFS Space Manager Design", published by Silicon Graphics, Oct. 7, 1993, 12 pages.
Doucette, Doug, "Space Manager Overview", published by Silicon Graphics, Dec. 16, 1993, 18 pages.
Doucette, Doug, "xFS Kernel Threads Support", supported by Silicon Graphics, Oct. 7, 1993, 3 pages.
Sweeney, Adam, "xFS Transaction Mechanism", published by Silicon Graphics, Oct. 7, 1993, 18 pages.
Hu, Wei, "UUIDs", published by Silicon Graphics, Oct. 7, 1993, 5 pages.
Santry et al., "Deciding When to Forget in the Elephant File System", published in 17th ACM Symposium Systems Principles (SOSP '99), published as Operating Systems Review, 34(5):110-123, Dec. 1999.
Lehey, Greg, The Complete FreeBSD, published Walnut Creek CDROM, 1999, 810 pages.
Tridgell, Andrew, "Samba 10 Year History", retrieved from www.samba.org/samba/docs/10years.html, Jan. 2002, 5 pages.
Seltzer et al., "An Implementation of a Log-Structured File System for UNIX", published in 1993 Winter USENIX, Jan. 25-29, 1993, 18.
AppleSingle/AppleDouble Formats for Foreign Files Developer's Note, published by Apple Computer, Inc., 1990, 21 pages.
Hacker, Thomas J., "The Design and Implementation of an AFP/AFS Protocol Translator", published by Center for Information Technology Integration, University of Michigan, Aug. 4, 1993, 16 pages.
"Plaintiff NetApp, Inc's Opening Claim Construction Brief", filed Jul. 7, 2008 in United States District Court, Northern District of California, San Francisco Division, Case No. 3:07-CV-06053-EDL, 41 pages.
"Sun Microsystems, Inc.'s Responsive Claim Construction Brief", filed Jul. 21, 2008 in United States District Court, Northern District of California, San Francisco Division, Case No. 3:07-CV-06053-EDL, 49 pages.
"NetApp, Inc.'s Reply to Sun Microsystems, Inc.'s Responsive Claim Construction Brief", filed Aug. 1, 2008 in United States District Court, Northern District of California, San Francisco Division, Case No. 3:07-CV-06053-EDL, 29 pages.
"Sun Microsystems, Inc.'s Reply Claim Construction Brief", filed Aug. 1, 2008 in United States District Court, Northern District of California, San Francisco Division, Case No. 3:07-CV-06053-EDL, 41 pages.
"Order Construing Claims", filed Sep. 10, 2008 in United States District Court, Northern District of California, San Francisco Division, Case No. 3:07-CV-06053-EDL, 60 pages.
"Further Order Construing Claims", filed Sep. 29, 2008 in United States District Court, Northern District of California, San Francisco Division, Case No. 3:07-CV-06053-EDL, 2 pages.
"Joint Report RE: Claim Construction of Incore Root Inode", filed Nov. 5, 2008 in United States District Court, Northern District of California, San Francisco Division, Case No. 3:07-CV-06053-EDL, 2 pages.
"Order Regarding Joint Report RE: Claim Construction of 'Incore Root Inode'", filed Mar. 2, 2009 in United States District Court, Northern District of California, San Francisco Division, Case No. 3:07-CV-06053-EDL, 2 pages.
"Defendant Sun Microsystems, Inc.'s Amended Answer and Counterclaim to Plaintiff Network Appliance, Inc.'s Complaint for Patent Infringement", filed Mar. 24, 2009 in United States District Court, Northern District of California, San Francisco Division, Case No. 3:07-CV-06053-EDL, 58 pages.
"NetApp Inc's Amended Reply to Sun's Amended Answer and Counterclaims", filed Apr. 2, 2009 in United States District Court, Northern District of California, San Francisco Division, Case No. 3:07-CV-06053-EDL, 40 pages.
"NetApp, Inc.'s Second Amended Reply to Sun's Amended Answer and Counterclaims", filed Sep. 9, 2009 in United States District Court, Northern District of California, San Francisco Division, Case No. 3:07-CV-06053-EDL, 40 pages.
"Stipulated Dismissal Without Prejudice and Order", filed Sep. 9, 2010 in United States District Court, Northern District of California, San Francisco Division, Case No. 3:07-CV-06053-EDL, 2 pages.

* cited by examiner

SYSTEM AND METHOD FOR RESTORING A SINGLE DATA STREAM FILE FROM A SNAPSHOT

RELATED APPLICATION

The present application is a continuation of U.S. patent application Ser. No. 10/393,781, which was filed on Mar. 21, 2003, now U.S. Pat. No. 7,165,079 entitled SYSTEM AND METHOD FOR RESTORING A SINGLE DATA STREAM FILE FROM A SNAPSHOT, by Raymond C. Chen et al., now issued as U.S. Pat. No. 7,165,079 on Jan. 16, 2007, which is a continuation-in-part of U.S. patent application Ser. No. 09/891,159, entitled SYSTEM AND METHOD FOR REPRESENTING NAMED DATA STREAMS WITHIN AN ON-DISK STRUCTURE OF A FILE SYSTEM, by Kayuri Patel et al., filed Jun. 25, 2001, now issued as U.S. Pat. No. 6,643,654 on Nov. 4, 2003, the contents of which are hereby incorporated by reference.

FIELD OF THE INVENTION

The present invention relates to data backup and restoral and, more particularly restoring a single data stream file from a backup.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in case of a filer, implement file system semantics, such as the Data ONTAP™ storage operating system, which is implemented as a microkernel. The Data ONTAP storage operating system is available from Network Appliance, Inc., of Sunnyvale, Calif., and implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of parity information with respect to the striped data. In the example of a WAFL file system, a RAID 4 level implementation is advantageously employed. This implementation specifically entails the striping of data across a group of disks, and separate parity storing within a selected disk of the RAID group. As described herein, a volume typically comprises at least one data disk and one associated parity disk (or possibly data/parity) partitions in a single disk arranged according to a RAID 4, or equivalent high-reliability, implementation.

The Microsoft Windows family of operating systems, including Microsoft Windows NT and Microsoft Windows 2000, utilize the NT file system (NTFS). Files stored within a NTFS file system may utilize multiple data streams. The representation of such NTFS streams on a file server is described in the above-incorporated patent application, entitled SYSTEM AND METHOD FOR REPRESENTING NAMED DATA STREAMS WITHIN AN ON-DISK STRUCTURE OF A FILE SYSTEM.

An example of the use of multiple data streams may involve the creation of a document, having summary, main content and index sections, by word processor software, e.g., Microsoft Word, executing on the conventional Microsoft Windows NT operating system. By employing the multiple data streams feature of the NT file system (NTFS), the summary section may be stored at a location on disk that is separate from the main content and index sections of the document. This enables a user (e.g., a client) to retrieve just the summary section independent of those other sections of the document. Note that apportionment of the various sections (named data streams) associated with the document is arbitrary and user selectable, and that named data streams may be created for both files and directories (folders).

In an exemplary file system, each unit of information associated with a file, including, for example, its name, its owner, time stamps, etc is implemented as a file attribute. Both files and directories have attributes, wherein each attribute may consist of a single data stream. Such an implementation facilitates the addition of new attributes to a file, including data content attributes. Therefore, files and directories may contain multiple data streams, however, each on-disk file must contain at least a default data stream through which the file data is accessed.

In the exemplary WAFL file system, individual files are described by inodes, including, for example, directory inodes, regular inodes and stream inodes. A stream inode represents a named data stream so that multiple data streams may be stored on disks associated with a storage appliance as representations embodying the stream inode type associated with a file. Each stream inode has its own size, file share locks, byte range locks and data blocks; however other file attributes, such as time stamps, group and user ownership information, and access control lists are common for all named data streams and are stored in an on-disk "base inode". The default data stream, along with its size, data blocks, file share locks and byte range locks, is also stored in the base inode. Additionally, the names and file handles of the data streams are stored in a "hidden" directory within the file system that is referenced by the base inode. The hidden directory is represented as a stream_dir inode type. The hidden directory is "invisible" in a directory hierarchy that is viewed by a user (e.g., a client) external to the file system and, thus, is inaccessible through an external file system protocol, such as the Common Internet File System protocol.

In the example of the Write Anywhere File Layout (WAFL) file system, by Network Appliance, Inc., of Sunnyvale, Calif., a file is represented as an inode data structure adapted for storage on disks. Broadly stated, the on-disk format representation of the exemplary WAFL file system is block based using, e.g., 4 kilobyte (KB) blocks and using inodes to describe the files. An inode is a data structure used to store information, such as meta data, about the file. That is, the information contained in an inode may include, e.g., ownership of the file, access permission for the file, size of the file, or other attributes, described further below. The WAFL file system uses a file handle, i.e., an identifier that includes an inode number, to retrieve an inode from disk. The exemplary WAFL file system also uses files to store meta data describing the layout of its file system. These meta data files include, among others, an inode file. The on-disk format structure of the WAFL file system, including inodes and the inode file, is disclosed and described in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., issued on Oct. 6, 1998 and incorporated by reference as though fully set forth herein.

A file is represented in the exemplary WAFL file system as an inode data structure adapted for storage on disk. FIG. 1 is a schematic block diagram illustrating the on-disk inode 100, which preferably includes a meta-data section 110 and a data section 150. The information stored in the meta-data section 110 of each inode 100 describes the file and, as such, includes the type (e.g., regular or directory) 112 of file, the size 114 of the file, time stamps (e.g., access and/or modification) 116 for the file and ownership, i.e., user identifier (UID 118) and group ID (GID 120), of the file. The meta-data section 110 further includes a xinode field 130 containing a pointer 132 that references another on-disk inode structure containing, e.g., access control list (ACL) information associated with the file or directory. The contents of the data section 150 of each inode, however, may be interpreted differently depending upon the type of file (inode) defined within the type field 112. For example, the data section 150 of a directory inode contains meta-data controlled by the file system, whereas the data section of a regular inode contains user-defined data. In this latter case, the data section 150 includes a representation of the data associated with the file.

Specifically, the data section 150 of a regular on-disk inode may include user data or pointers, the latter referencing 4 KB data blocks on disk used to store the user data. Each pointer is preferably a logical volume block number to thereby facilitate efficiency among the file system when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kilobytes (KB), then the data section of the inode comprises up to 16 pointers, each of which references a 4 KB block of data on the disk. Moreover, if the size of the data is greater than 64 kilobytes but less than or equal to 64 megabytes (MB), then each pointer in the data section 150 of the inode references an indirect inode that contains 1024 pointers, each of which references a 4 KB data block on disk. In addition, the size field 114 of the meta-data section 110 of the inode refers to the size of the file.

Some known storage operating systems contain the capability to generate a snap-shot of the file system. In the example of a WAFL-based file system, snapshots are described in *TR3002 File System Design for a NFS File Server Appliance* by David Hitz et al., published by Network Appliance, Inc. and in U.S. Pat. No. 5,819,292 ENTITLED METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the filer, and more particularly, of the active file system, stored on a storage device (e.g., on disk) or in other persistent memory and having a name or other identifier that distinguishes it from other PCPIs taken at other points in time. A PCPI can also include other information (meta data) about the active file system at the particular point in time for which the image is taken. The terms "PCPI" and "snapshot" shall be used interchangeably through out this patent without derogation of Network Appliance's trademark rights. Generally, a snapshot may be viewed as an example of a read only reference store. In contrast, the active file system may be viewed as an example of an active store that permits read and write operations.

A snapshot is a restorable version of a file system created at a predetermined point in time. Snapshots are generally created on some regular schedule. The snapshot is stored on-disk along with the active file system, and is called into the buffer cache of the filer memory as requested by the storage operating system. An exemplary file system inode structure 200 is shown in FIG. 2. The inode for an inode file 205 contains information describing the inode file associated with a given file system. In this exemplary file system inode structure the inode for the inode file 205 contains a pointer to an inode file indirect block 210. The inode file indirect block 210 contains a set of pointers to inodes 217, which in turn contain pointers to indirect blocks 219. The indirect blocks 219 include pointers to file data blocks 220A, 220B and 220C. Each of the file data blocks 220(A-C) is capable of storing, in the illustrative embodiment, 4 kilobytes (KB) of data.

When the storage operating system generates a snapshot of a given file system, a snapshot inode is generated as shown in FIG. 3. The snapshot inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the snapshot inode 305 contains a point to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that meta data (not shown) stored in any snapshotted blocks (e.g., 305, 210, and 220C) protects these blocks from being recycled or overwritten until they are released from all snapshots. Thus, while the active file system inode for the inode file 405 points to new blocks 220A, 220B and 220C', the old blocks 210, 217, 219 and 220C are retained until the snapshot is fully released.

After a snapshot has been created and file data blocks modified, the file storage operating system can reconstruct or "restore" the file system inode structure as it existed at the time of the snapshot by accessing the snapshot inode. By following the pointers contained in the snapshot inode 305 through the inode file indirect block 210, inode 217 and indirect block 219 to the unmodified file data blocks 220A-C, the storage operating system can reconstruct the file system as it existed at the time of creation of the snapshot.

In known restoration techniques from snapshots, the snapshotted files are copied from the snapshot to the active file system. These copies are generated by duplicating inodes and data blocks stored in the snapshot and writing these duplicated blocks and inodes to the active file system. Thus, the snapshot is effectively duplicated into the active file system. A noted disadvantage of such a restore technique is that each inode or data block of the snapshot needs to be copied. Such copying, in the case of a large file system, can require a substantial amount of time and processing power. For example, files may be sized on the order of tens of gigabytes. Similarly, using known file restore techniques from a snapshot, the volume containing the snapshotted file must be large enough to accommodate two full copies of the file, namely, the snapshot and the file in the active file system. In the example of the large file, a volume may not be of sufficient size to accommodate two full copies of the file.

One technique to avoid resource-consuming duplication the entire file system is to use the storage operating system's capabilities to restore on demand. Restore on demand techniques are described generally in U.S. patent application Ser. No. 10/101,901 entitled SYSTEM AND METHOD FOR MANAGING A PLURALITY OF SNAPSHOTS by Hugo Patterson et al., now issued as U.S. Pat. No. 7,475,098 on Jan. 6, 2009. A noted disadvantage of such restore on demand technique is an entire directory tree associated with the file must also be restored. For example, if the desired file to be restored is two directories down, for example, in /foo/bar/file, then the directory foo and the subdirectory /bar must also be restored. This reduces the efficiency of the file restoration process. Additionally, such restore on demand techniques typically cannot support the restoration of files that include streams or other metadata that are not stored internal to the file, but are stored in a separate data stream associated with the file. Such restore on demand techniques typically utilize the snapshot copying methodology, described above, to restore a particular file. Thus, the noted disadvantages of the snapshot duplication method, e.g., processing overhead and use of file system space, are inherent in these restore on demand techniques.

However, there are instances when the restoration of only a single file from a snapshot, without restoring the associated directory tree, is desired. For example, the entire file system may not suffer an error condition, but a single file may have become corrupted or otherwise needs to be restored. Conventional restore on demand techniques may not properly restore those files that include one or more data streams, as the data streams are not contained within the data section of the file. These streams and associated metadata may be restored by, for example, restoring an entire volume from a snapshot; however, the restoration of an entire volume is a clearly inefficient approach when only a single file in a large file system needs to be restored. Thus, it is desirous for a system and method to restore a single file from a snapshot that includes one or more data streams associated therewith.

SUMMARY OF THE INVENTION

The disadvantages of the prior art are overcome by providing a system and method for quickly restoring a single data stream file from a snapshot of a file system executing on a server, such as a filer. Initially, the determination is made if the data stream file is in the active file system. If a file has been deleted from the active file system, then an inode is created and its associated buffer tree is generated which points to the data blocks and the file to be restored. This newly created inode and associated buffer tree is then written to the active file system. The associated data streams are then copied from the snapshot to the active file system, thereby restoring the data stream file. By avoiding duplication of the data blocks, substantial storage space, processing overhead and time is saved.

If the file does exist in the active file system, then the snapshot restoration process duplicates the file inode into a twin inode and moves the buffer tree of the file to the twin inode. A new inode for the restored file is then generated. A reconciliation process then compares block pointers from the duplicated twin inode and snapshot inodes. If the block pointers match, then the block pointers are moved from twin inode into the inode of the restored file in the active file system. If the block pointers and the block not already in the active file system differ, then the block pointer from the snapshot is copied to the active file system. Otherwise the actual data block is copied from the snapshot to the active file system. At the end of the reconciliation process, the twin inode only contains block pointers to blocks that have changed with respect to the snapshot. After completion of the reconciliation process, the associated streams of the file are copied from the snapshot to the active file system. The file is then restored from the active file system.

By not duplicating the numerous data blocks stored in the snapshot, substantial processing time/overhead and storage space is saved. In alternate embodiments, the determination can be made based upon the size of the file to be restored. If the file is of a certain size or smaller, the restoration process may utilize a conventional snapshot duplication technique, otherwise the novel nonduplication method described herein may be practiced.

BRIEF DESCRIPTION OF THE DRAWINGS

The invention description below refers to the accompanying drawings, of which.

DETAILED DESCRIPTION OF AN ILLUSTRATIVE EMBODIMENT

A. Filers

Figure 1:
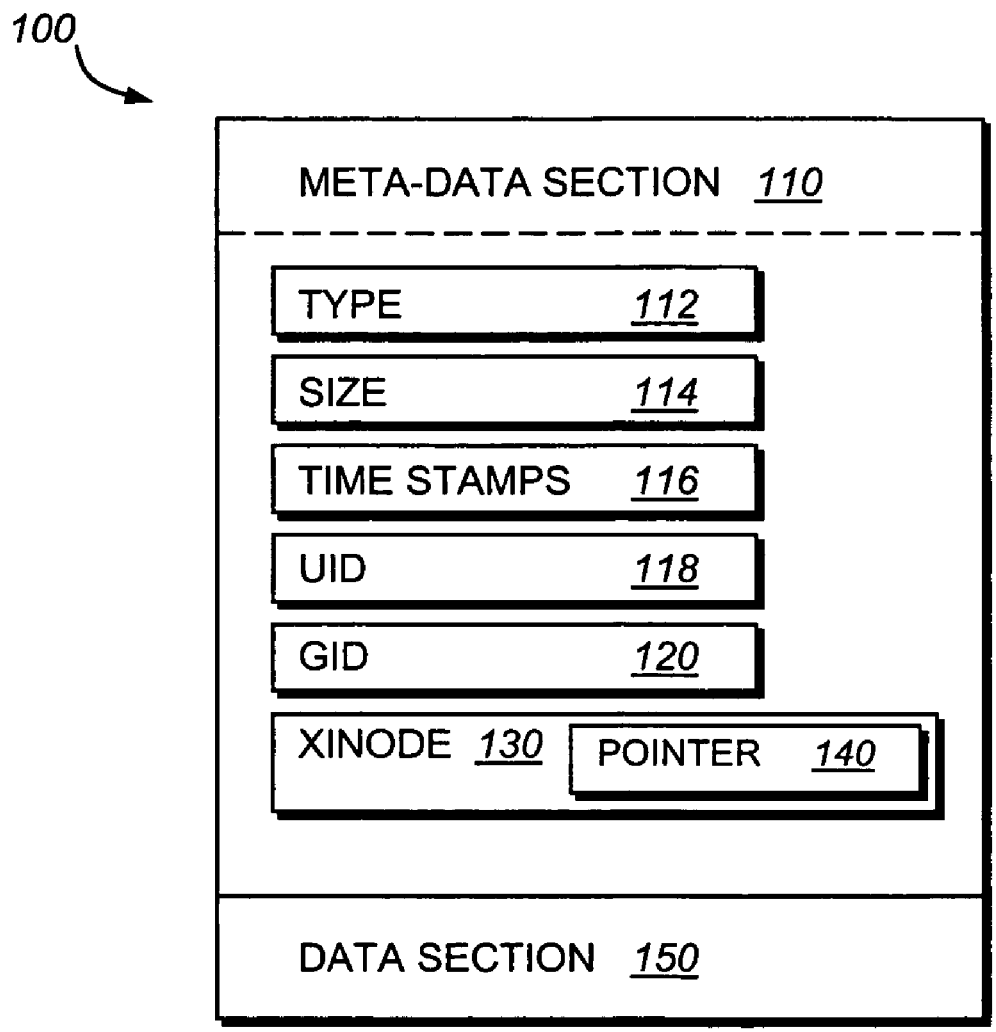
FIG. 1, already described, is a schematic block diagram of an exemplary on-disk inode structure.
Figure 2:
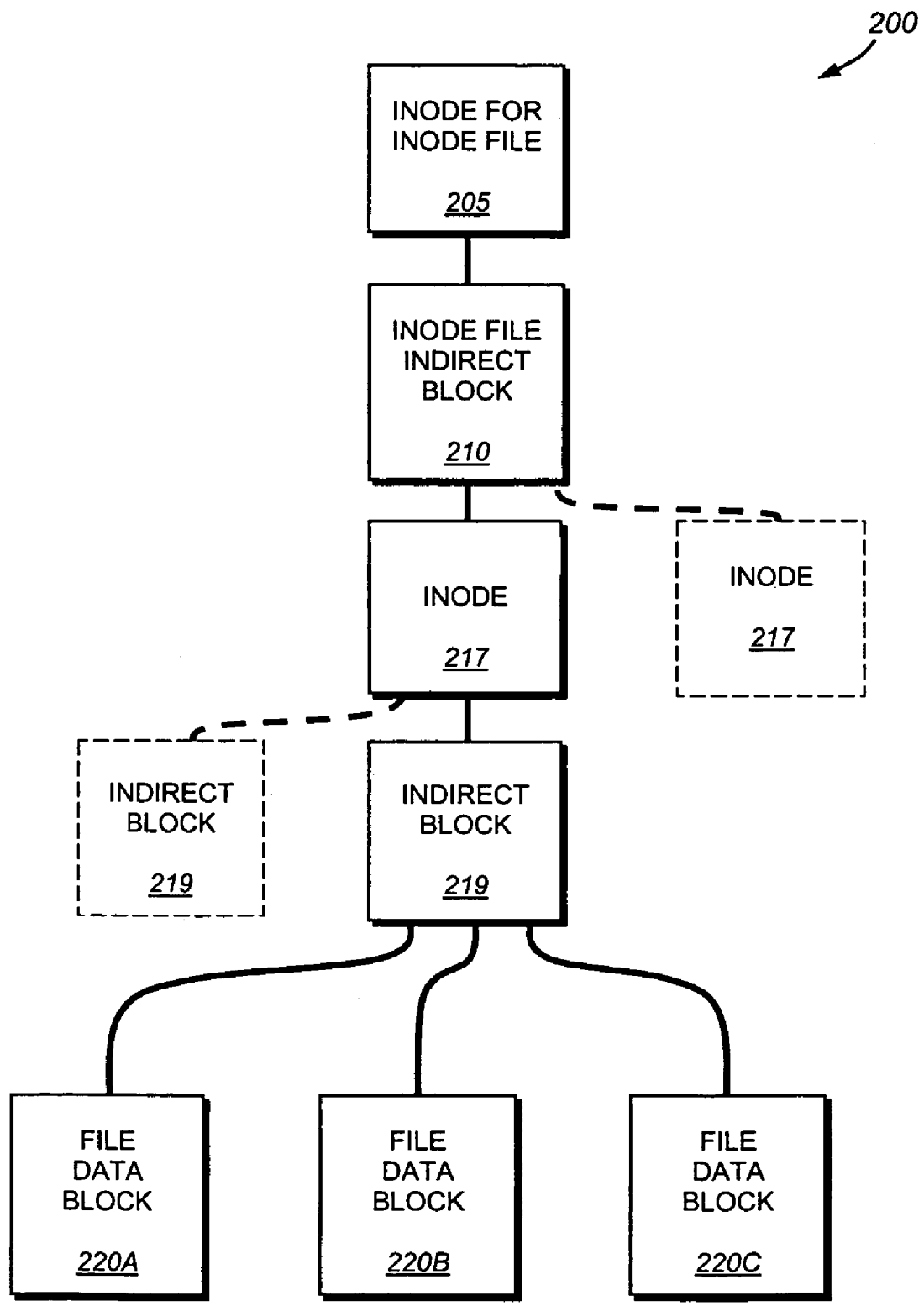
FIG. 2, already described, is a schematic block diagram of an exemplary on-disk file.
Figure 3:
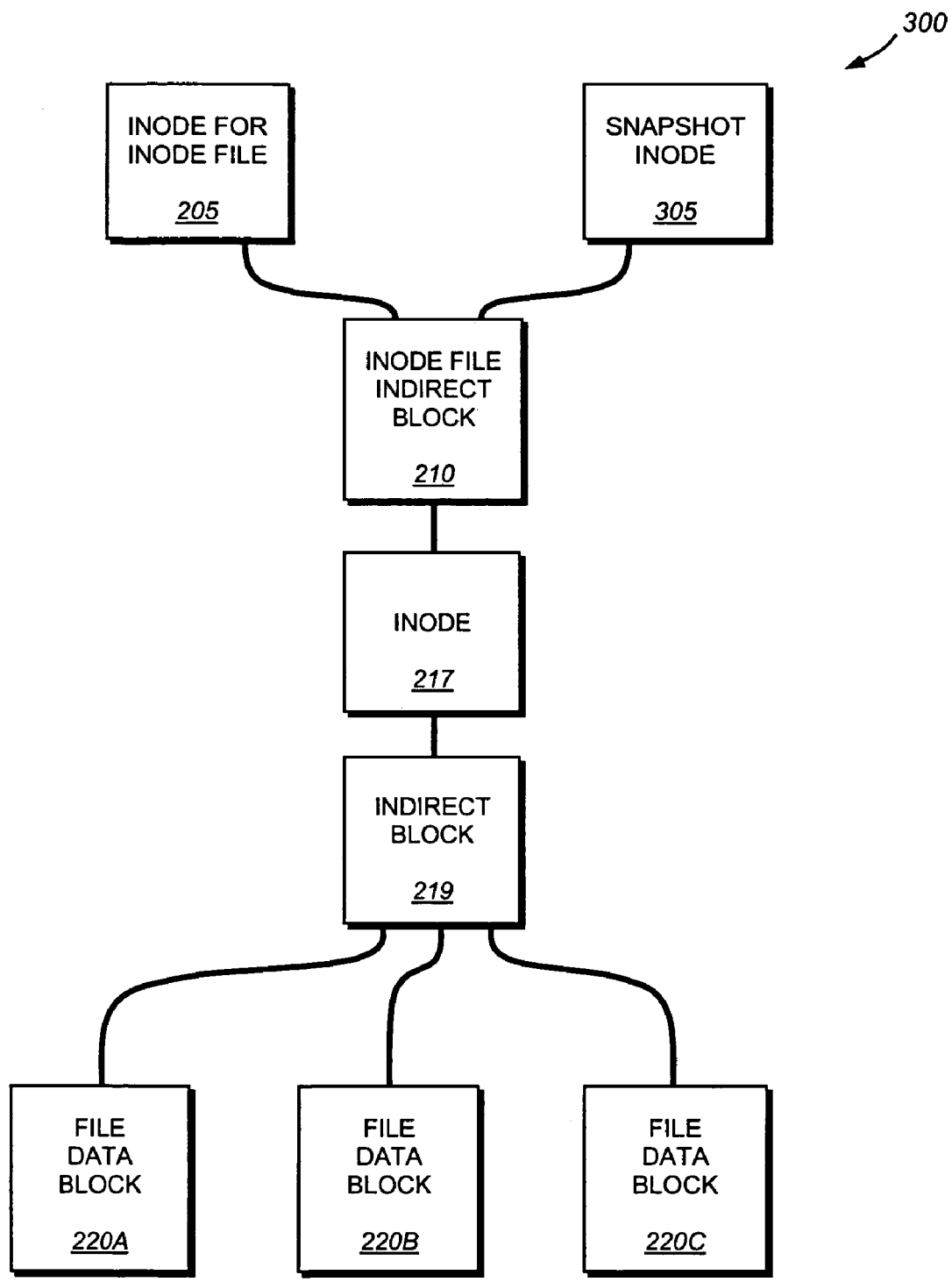
FIG. 3, already described, is an exemplary on-disk representation of a file showing an associated snapshot inode.
Figure 4:
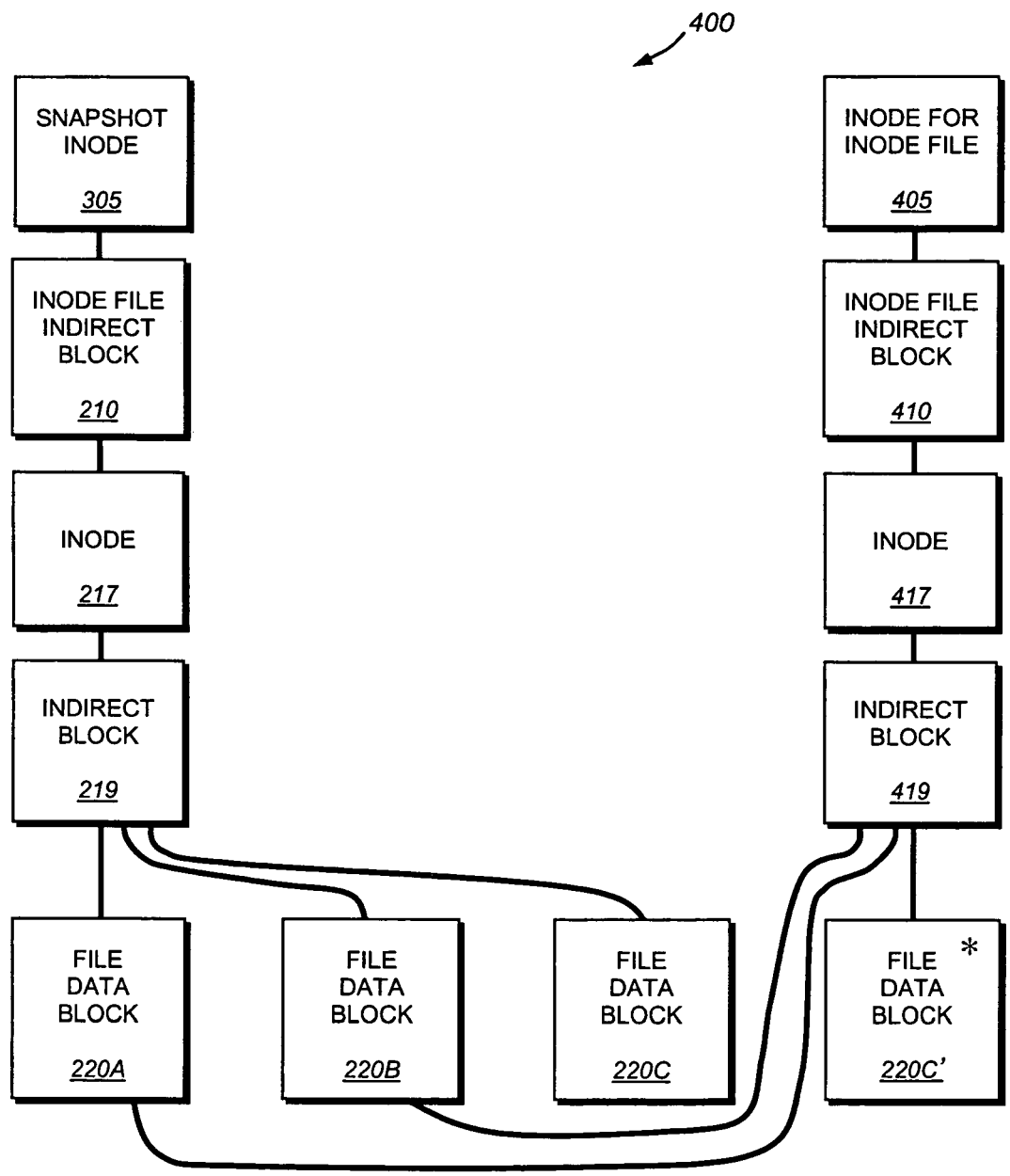
FIG. 4, already described, is an exemplary on-disk representation of a modified file showing a snapshot inode and regular file inode.
Figure 5:
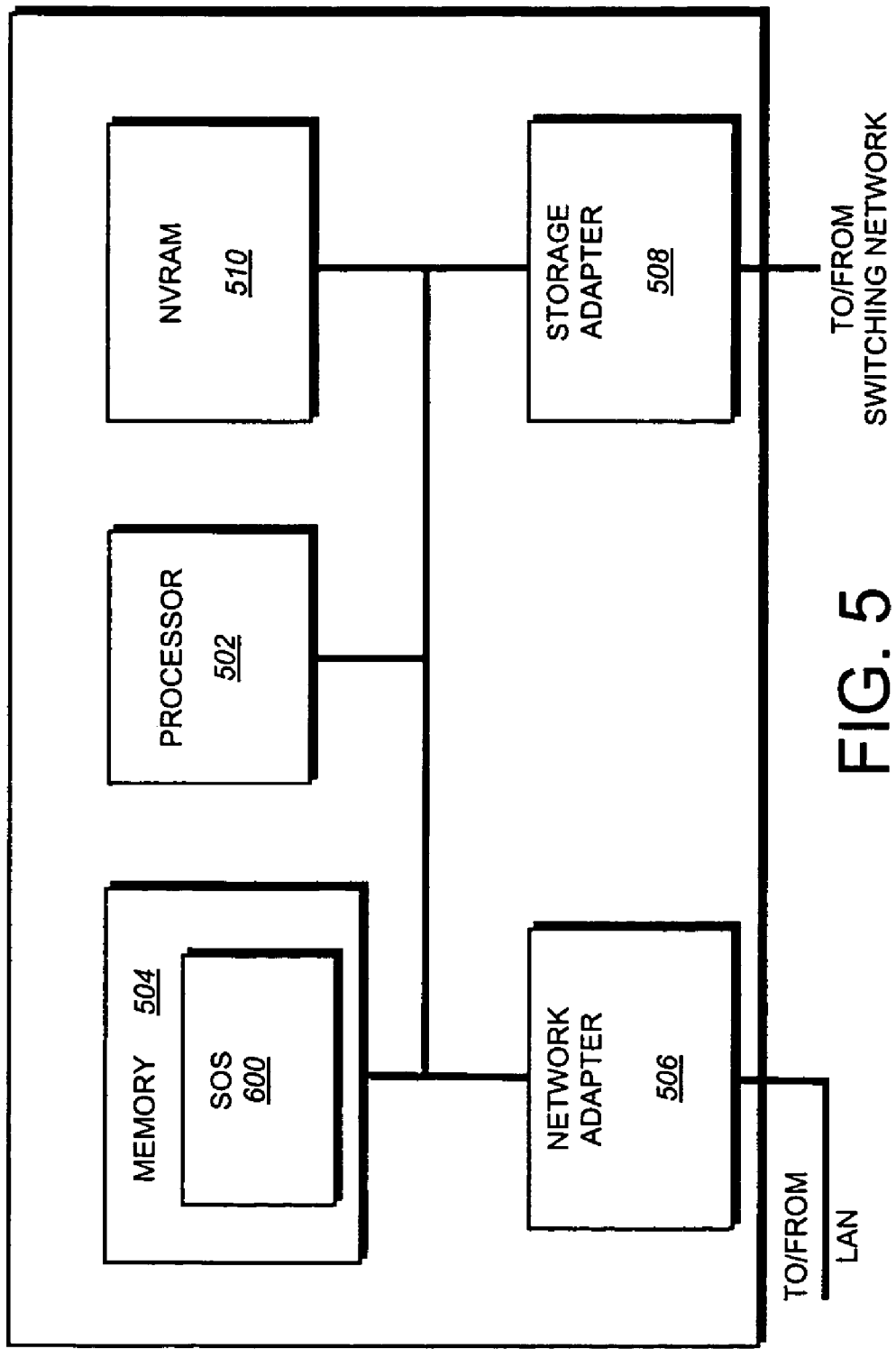
FIG. 5 is a schematic block diagram of a multi-protocol storage appliance in accordance with an embodiment of the present invention.

An exemplary file server, or filer, architecture is now described in further detail. FIG. 5 is a more-detailed schematic block diagram of the exemplary file server 500 implemented as a network storage appliance, such as the NetApp® filer available from Network Appliance, that can execute the above-described Data ONTAP™ software and is advantageously used with the present invention. By way of background, a network storage appliance is a special-purpose computer that provides file service relating to the organization of information on storage devices, such as disks. However, it will be understood by those skilled in the art that the inventive concepts described herein may apply to any type of filer whether implemented as a special-purpose or general-purpose computer, including a standalone computer. The filer 500 comprises a processor 502, a memory 504, a network adapter 506 and a storage adapter 508 interconnected by a system bus 505. The filer 500 also includes a storage operating system 600 that implements a file system to logically organize the information as a hierarchical structure of directories and files on the disks.

In the illustrative embodiment, the memory 504 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the filer 500 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 506 comprises the mechanical, electrical and signaling circuitry needed to connect the filer 500 to a client over a computer network. A client can be a general-purpose computer configured to execute applications including file system protocols, such as the Common Internet File System (CIFS) protocol. Moreover, the client can interact with the filer 500 in accordance with a client/server model of information delivery. That is, the client may request the services of the filer, and the filer may return the results of the services requested by the client, by exchanging packets that conform to, e.g., the CIFS protocol format over the network 102. The format of the CIFS protocol packet exchanged over the network is well-known and described in *Common Internet File System (CIFS) Version: CIFS*-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein.

The storage adapter 508 cooperates with the storage operating system 230 executing on the filer to access information requested by the client. The storage adapter 508 includes input/output (I/O) interface circuitry that couples to the disks over an I/O interconnect arrangement, such as a conventional high-performance, Fibre Channel serial link topology. The information is retrieved by the storage adapter 508 and, if necessary, processed by the processor 502 (or the adapter itself) prior to being forwarded over the system bus 505 to the network adapter 226, where the information is formatted into a packet and returned to the client.

Notably, the exemplary filer 500 includes an NVRAM 510 that provides fault-tolerant backup of data, enabling the integrity of filer transactions to survive a service interruption based upon a power failure, or other fault. The NVRAM 510 is typically made sufficiently large to log a certain time-based chunk of transactions (for example, several seconds worth). The NVRAM entry may be constructed in parallel with execution of the corresponding request, once it is determined that a request will be successfully performed but it must be completed (as must any copying to mirror NVRAM of the partner in a cluster configuration) before the result of the request is returned to the requesting client.

B. Storage Operating System

The storage operating system 600 implements a file system that logically organizes information as a hierarchical structure of directories and files on the disks. Each "on-disk" file may be implemented as set of disk blocks configured to store information, such as text, whereas the directory may be implemented as a specially formatted file in which other files and directories are stored. In the illustrative embodiment described herein, the storage operating system 600 associated with each volume is, for example, the NetApp® Data ONTAP™ operating system available from Network Appliance, Inc. of Sunnyvale, Calif. that implements a Write Anywhere File Layout (WAFL) file system. The preferred storage operating system for the exemplary filer is now described briefly. However, it is expressly contemplated that the principles of this invention can be implemented using a variety of alternate storage operating system architectures.

Figure 6:
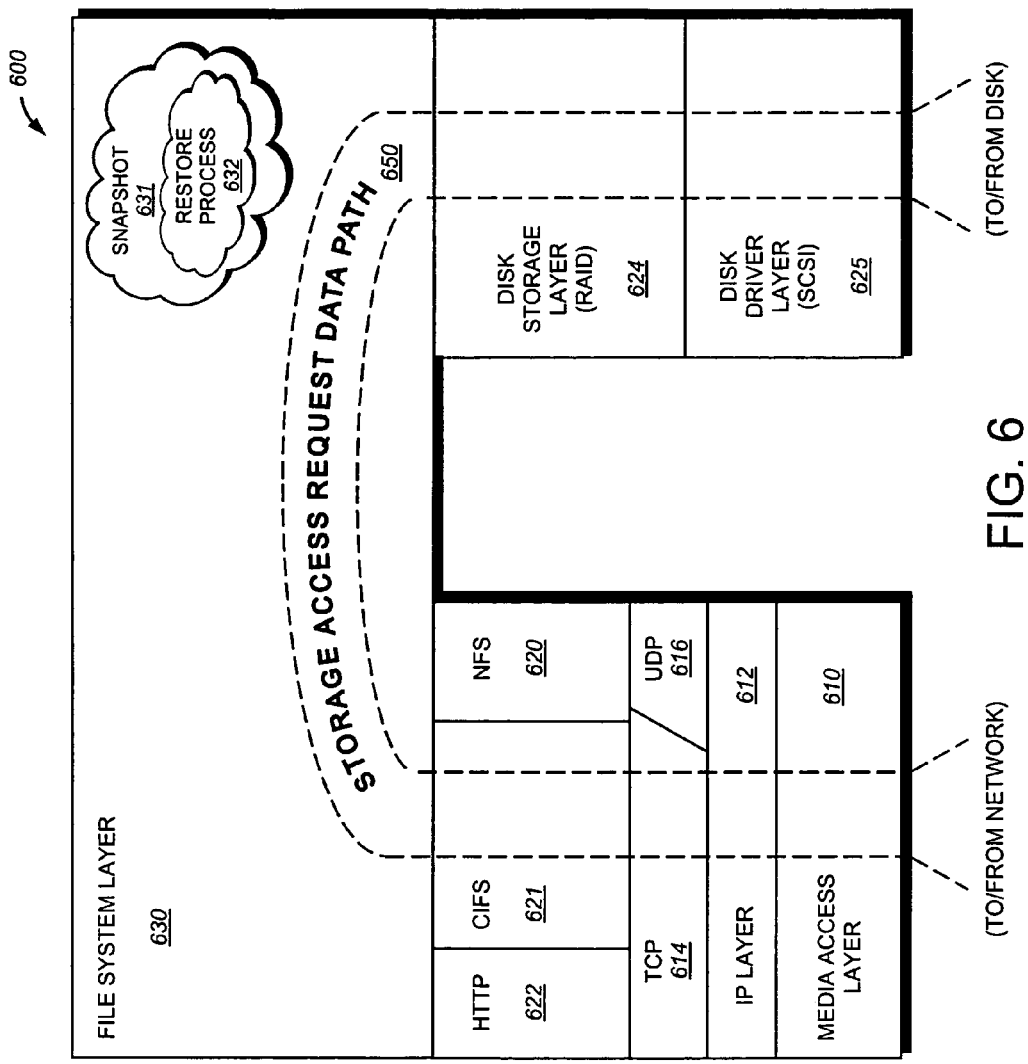
FIG. 6 is a schematic block diagram of an exemplary storage operating system in accordance with an embodiment of the present invention.

As shown in FIG. 6, the storage operating system 600 comprises a series of software layers, including a media access layer 610 of network drivers (e.g., an Ethernet driver). The storage operating system 600 further includes network protocol layers, such as the IP layer 612 and its TCP layer 614, and UDP layer 616. A file system protocol layer provides multi-protocol data access and, to that end, includes support for the CIFS protocol 621, the Network File System (NFS) protocol 620 and the HTTP protocol 622. In addition, the storage operating system 600 includes a disk storage layer 624 that implements a disk storage protocol, such as a RAID protocol, and a disk driver layer 626 that implements a disk access protocol such as, e.g., a Small Computer Systems Interface (SCSI) protocol.

Bridging the disk software layers with the network and file system protocol layers is a file system layer 630 of the storage operating system. Generally, the layer implements a file system having an on-disk format representation that is block-based using, e.g., 4-kilobyte (KB) data blocks and using inodes to describe the files. In response to transaction requests, the file system generates operations to load (retrieve) the requested data from volumes if it is not resident "in-core", i.e., in the filer's memory 504. If the information is not in memory, the file system layer 630 indexes into the inode file using the inode number to access an appropriate entry and retrieve a logical volume block number. The layer 630 then passes the logical volume block number to the disk storage (RAID) layer 624, which maps that logical number to a disk block number and sends the latter to an appropriate driver (for example, an encapsulation of SCSI implemented on a fibre channel disk interconnection) of the disk driver layer 626. The disk driver accesses the disk block number from volumes and loads the requested data in memory 504 for processing by the filer 500. Upon completion of the request, the filer (and storage operating system) returns a reply, e.g., a conventional acknowledgement packet defined by the CIFS specification, to the client 104.

It should be noted that the software "path" 650 through the storage operating system layers described above needed to perform data storage access for the client request received at the filer may alternatively be implemented in hardware or a combination of hardware and software. The term "metadata" refers to data that is generated, stores and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data."

Included within the file system 630 is a set of snapshot processes 631, which implement the inherent snapshot capabilities of the file system including, e.g., the data stream file restoration process 632, described below. The inherent snapshot capabilities of the WAFL file system are further described in the above-incorporated *TR3002 File System Design for an NFS File Server Appliance* and U.S. Pat. No. 5,819,292. The snapshot processes include a vdisk restore function that implements the novel vdisk restoration system and method.

Figure 7:
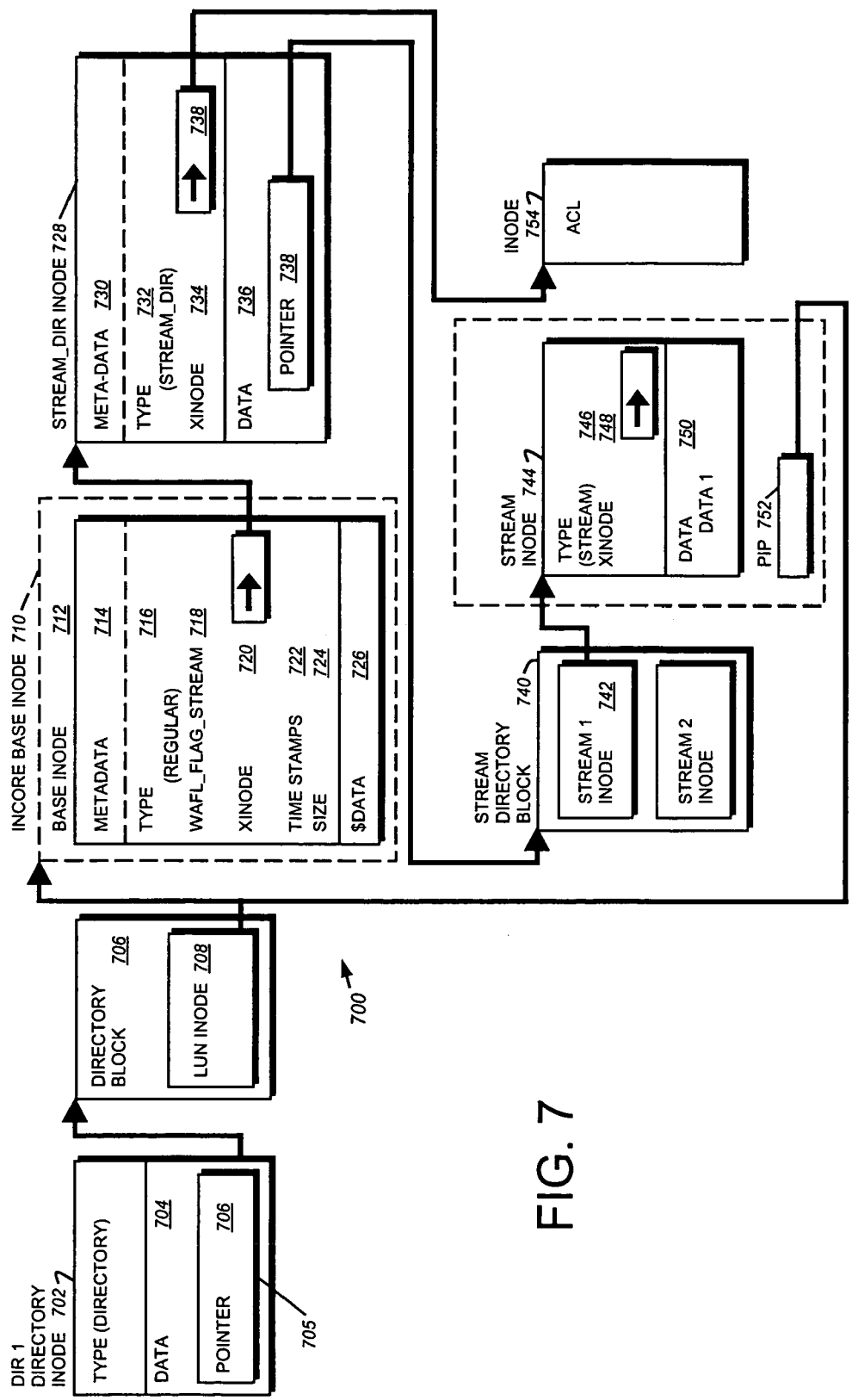
FIG. 7 is an exemplary on-disk inode structure of a stream data file.

The storage system provides an on-disk representation of a data stream file stored on, for example, a filer. FIG. 7 is a schematic block diagram illustrating the exemplary on-disk representation disk 700 of inode data structures, including stream inodes. A directory (DIR1) inode 702 includes a data section 704 of pointers 705 that references data directory blocks, one which is directory block 700. The directory block includes a plurality of entries, each containing an external representation of an inode (i.e., the name of the inode) along with mapping information (i.e., the inode number) for that inode. One of those entries, entry 708, contains mapping information (e.g., a pointer) that references a base inode 712. The base inode 712 is a regular inode identified by the type of field 716. The data section 726 of base inode 712 contains pointers to additional inodes pointing to data blocks as a conventional file does. However, the base inode 712 includes in the flags field, a flag identifying it as a stream data file.

Specifically, the WAFL_flag_stream flag 718 identifies the inode 712 as having not only a default data stream section ($DATA) 726 but also one or more named data stream "sections". In addition, a free inode is allocated and converted to a stream_dir inode 728 upon insertion of the type "stream_dir" into type field 732 by the WAFL layer. Although the inode 712 includes the default data stream ($DATA) within data section 726, the stream_dir inode 728 is created to enable storage of the named data streams within the on-disk structure of the file system. In order to access the newly created stream directory, the pointer of xinode field 720 in base inode 712 is modified to reference the stream_dir inode 728 allocated for the stream directory.

The stream directory 728 includes a data section 736 of pointers 738 that references stream directory data blocks associated with named data streams, one of which is stream directory block 740. As noted, the xinode field of an inode typically references an inode dedicated to storing ACL information. Since the entire 128-byte capacity of each inode is utilized, the xinode field of a base inode is "overloaded" to reference the stream directory. Thus, the xinode field 720 of the base inode 712 is configured to reference the stream_dir inode 728. The WAFL file system differentiates the functions of the xinode field (i.e., referencing an ACL inode or a stream directory inode) by, among other things, the assertion of the WAFL_flag_stream flag within a base inode. In particular, assertion of the WAFL_flag_stream flag 718 denotes use of the xinode pointer to reference a stream directory inode.

The stream directory block 740 includes a plurality of entries, one of which (entry 742) references (points to) stream inode 744. The stream inode 744 represents a named data stream. The stream inode 744 includes a type field 746 containing the type (e.g., stream) of the inode 744 and a data section 750 that represents data blocks (e.g., DATA) associated with the named stream.

In the example of the WAFL file system, all of the inodes associated with the named data streams (e.g., the base inode 712, the stream_dir inode 728 and the stream inode 744) use the same ACL information contained within appropriate ACL inode of the file system. The meta-data attributes (e.g., time stamps and ownership information) for the named data stream reside within the base inode for that named stream. As a result, when a stream inode is modified, its base inode must be loaded into memory so that its meta-data section may be updated to reflect the modification. The function of the xinode field can be distinguished based upon the type of inode; i.e., the stream inode type does not have an xinode field that references ACL information because its ACL "lives" (is referenced by) the base inode.

While there has been shown and described an illustrative embodiment for providing on-disk representations of multiple named data streams for a file system of a network storage appliance, it is to be understood that various other adaptations and modifications may be made within the spirit and scope of the invention. For example, the present invention also contemplates an "incore" representation of the named data streams described herein. In general, when an on-disk inode is loaded from disk into memory, its corresponding incore inode representation may include additional information, such as a back pointer to its incore base inode and a pointer to an incore ACL inode. The dotted lines surrounding the inodes shown in FIG. 7 indicate the incore representation of the on-disk inode structures.

Specifically, when an on-disk inode is loaded "incore" to the memory, the corresponding incore inode structure "embeds" the on-disk inode structure. The incore inode is a block of memory that stores the on-disk inode structure plus additional information needed to manage data in the memory (but not on disk). This additional information may include a parent inode pointer (pip) 752 that is an incore pointer used to reference the beginning of an incore base inode from, e.g., an incore stream inode. In other words, the pip represents a physical address of an incore inode within the memory, whereas the pointer references a logical address (e.g., inode number that maps to a logical volume block) on disk.

C. File Restoration from a Snapshot

Figure 8:
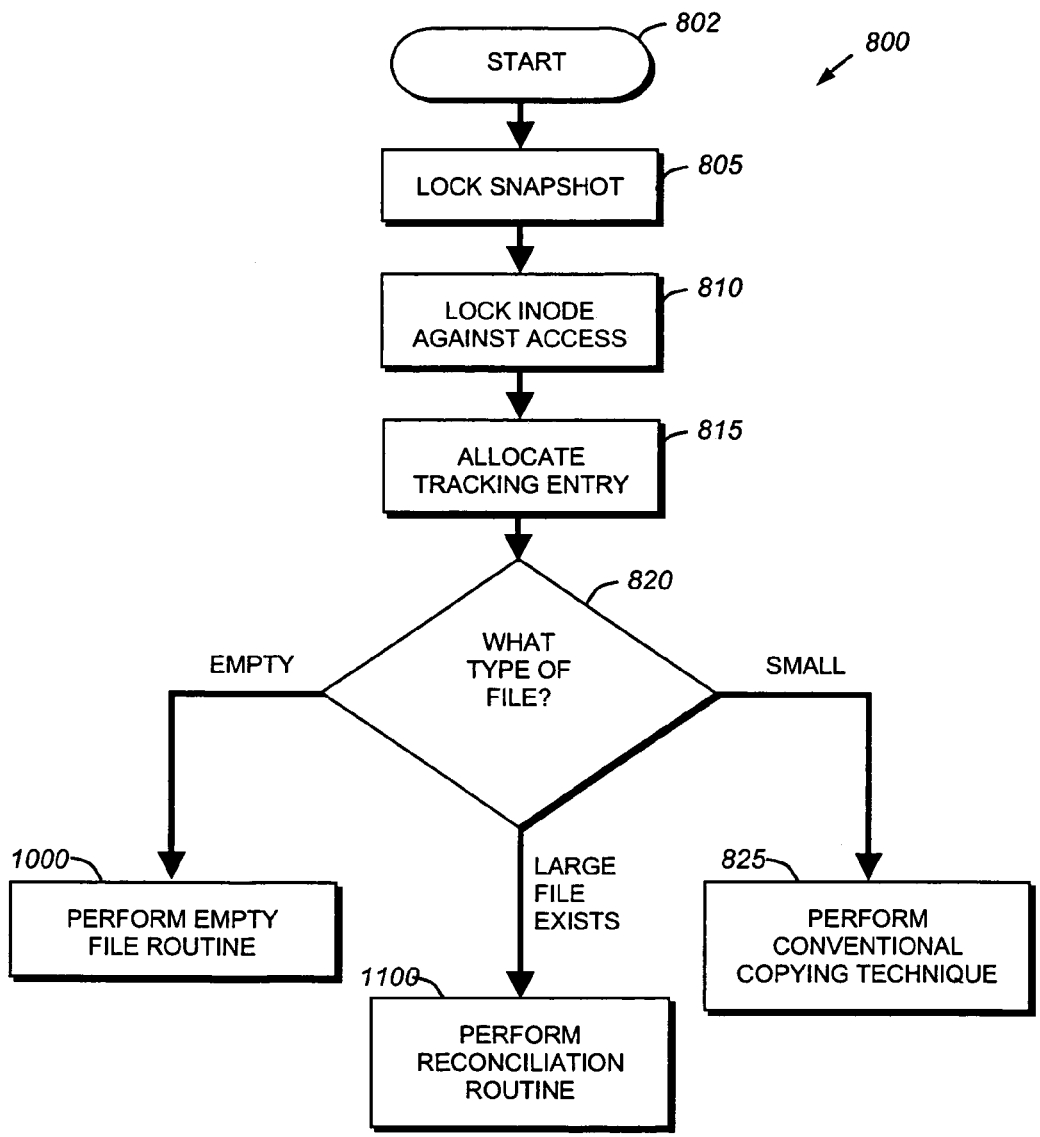
FIG. 8 is a flowchart detailing a procedure for performing a restoration of a single data stream file from a snapshot in accordance with an embodiment of the present invention.

The procedure 800 performed by the file system of the storage operating system, or its associated snapshot processes, in restoring a file from a snapshot is shown in FIG. 8. Typically, such a data stream file restore process would be initiated by the use of a command entered by the user or administrator of the file server. This command could be entered either through a command line interface (CLI) or via a menu or other selection in a graphical user interface (GUI). As options to the command, the user enters the name and path to the file to be restored and, in alternate embodiments, a name and path for the file to be restored to, if it is different from the files original and/or location. Thus, for example, a file that was snapshotted when it existed in /dir/sub/file, could be restored to /foo/bar/otherfile.

The procedure begins in step 802 and proceeds to step 805, where the file restore process first locks the associated snapshot. Such snapshot locking can be accomplished using known file system file locking mechanisms. The locking of the snapshot ensures that the snapshot will not be modified or deleted while the file is being restored. Next, in step 810, the inode associated with the file to be restored is locked against access. Such locking can be accomplished by, for example, setting a flag within the inode that is manipulated by an appropriate operating system lock manager. The file system layer and its associated processes recognize the flag and thereby restrict access to the inode. In certain embodiments, select file system processes or functions may have access to the inode. For example, a process or function for determining attributes of the file associated with the inode may be permitted to access the inode to determine file system parameters. Similarly, in certain embodiments, a command or process to delete the file may be permitted to execute even though the inode is locked against access.

The file restore process then creates a tracking entry (step 815). This tracking entry, described further below, is utilized to determine which inodes and block pointers have been compared during the remaining portion of the restore process. Next, in step 820, the restore process determines what type of file is being restored. By "type of file" it is meant, in the illustrative embodiment, whether the file exists in the active file system, is absent from the active file system, or is a small file.

If the file to be restored is a small file, the process performs the conventional copying restore technique by duplicating the inodes' block pointers and data blocks from the snapshot to the active file system. If the file is absent from the active file system (i.e. the file has been deleted from the active file system), the restore process performs the empty file routine (routine 1000). Otherwise, the file exists in the active file system and is not a small file. In such a case, the restore process proceeds to step 1100 and performs the standard file restore routine.

Figure 9:
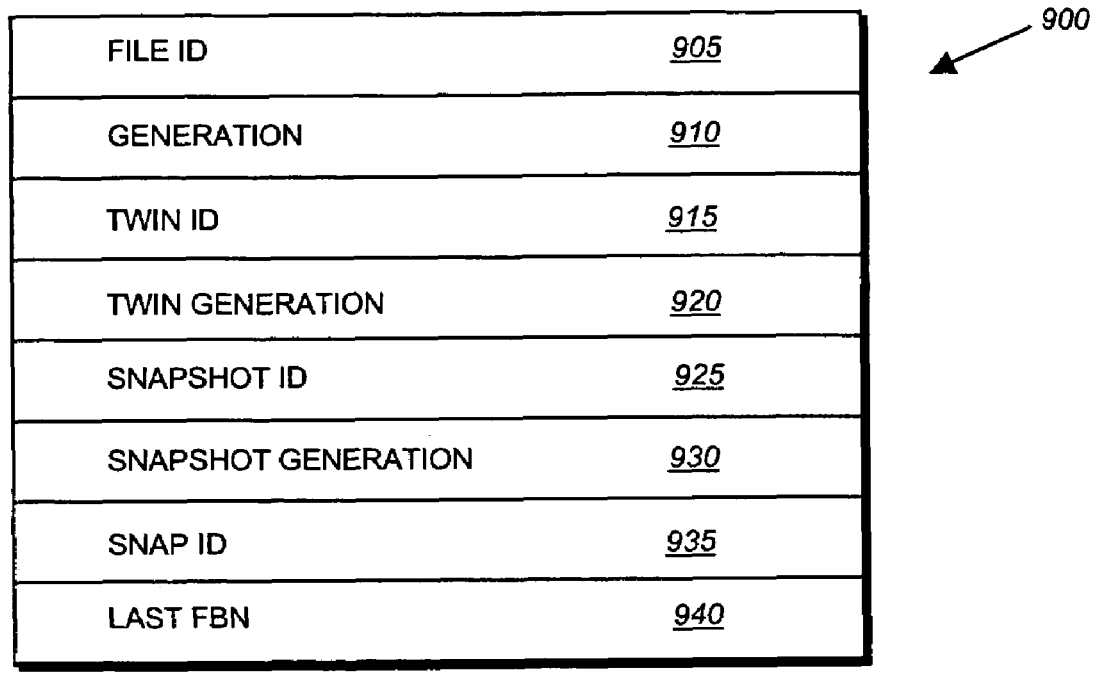
FIG. 9 is a schematic block diagram of an exemplary tracking entry in accordance with an embodiment of the present invention.

FIG. 9 is a schematic block diagram of an exemplary tracking entry 900 in accordance with an embodiment of the invention. The tracking entry 900 includes field for a file ID 905, a generation number 910, a twin ID and generation 915 and 920, a snapshot ID and generation 925 and 930, a snap ID 935 and last field block number (FBN) field 940. The file ID field 905 contains the file ID of the file of the active file system. The generation field 910 includes the generation count of the file in the active file system. Similarly, the twin ID and generation fields 915 and 920 contain the file ID and generation count of the twin inode created during a restoration process. The snapshot ID 925 and snapshot generation 930 also correspond to the ID of the file on the snapshot in the generation count of the file in the snapshot. Finally, the last FBN field 940 is utilized as a storage space to hold the last file block number that was reconciled during the buffer tree reconciliation process, described further below. Thus, the reconciliation process utilizes the tracking entry to determine its progress in reconciliating the FBNs associated with the snapshot.

Figure 10:
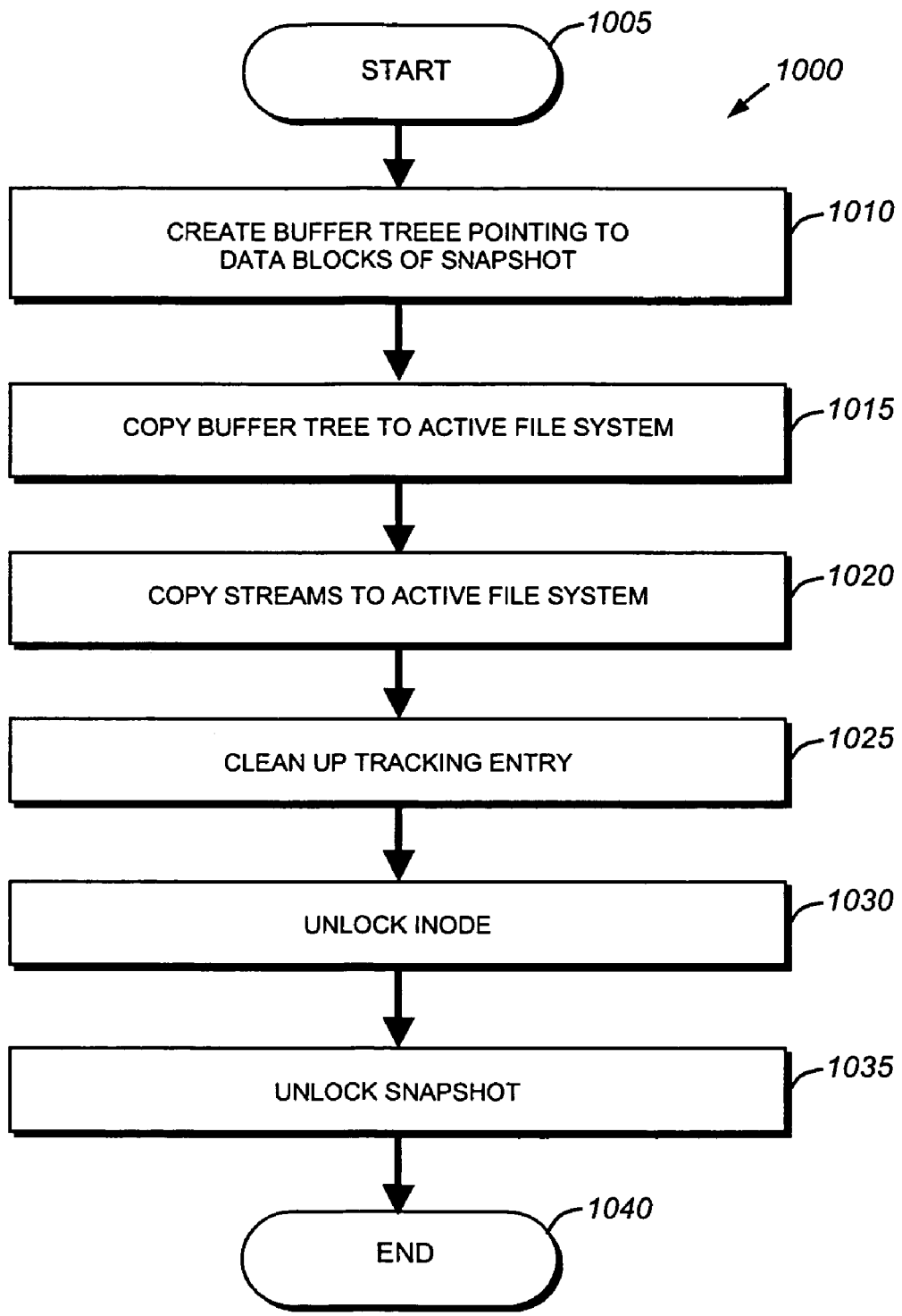
FIG. 10 is a flowchart detailing the steps of a procedure for restoring a single data stream file to the active file system if the file was previously deleted from the active file system.

FIG. 10 is a flowchart illustrating the restore routine 1000 performed by the restore process 632 when the file is not in the active file system is shown in FIG. 10. The procedure begins in step 1005 and proceeds to step 1010 where the restore process creates a buffer tree pointing to the data blocks of the snapshot. This buffer tree is then copied to the active file system (step 1015). By utilizing the data blocks stored in the snapshot, the number of additional inode blocks in the buffer tree is minimized as these data blocks do not need to be duplicated. Thus, minimal additional file system space is required. Next, in step 1020, the streams associated with the file are copied from the snapshot to the active file system. During this copying process, the appropriate pointers are generated within the base inode of the file to point to the appropriate streams in the active file system. The tracking entry is then removed in step 1025. This removal process entails, for example, the allocation of memory or other data structures associated with the tracking entry. The newly created inode is then unlocked in step 1030. Finally, in step 1035, the snapshot is unlocked. The procedure is then complete step 1040. At this point, the newly created inode resides in the active file system and contains the proper pointers and buffer tree corresponding to the data blocks of the snapshot. By pointing to the data blocks stored in the snapshot, the number of inode blocks that must be written is decreased by a factor equal to the number of data blocks that each inode can point to. In the illustrative embodiment, each inode can point to 1,024 data blocks. Thus, by utilizing this restoration process, fewer than 1/1024 of the data block must be accessed compared to conventional snapshot restore methodologies.

Figure 11:
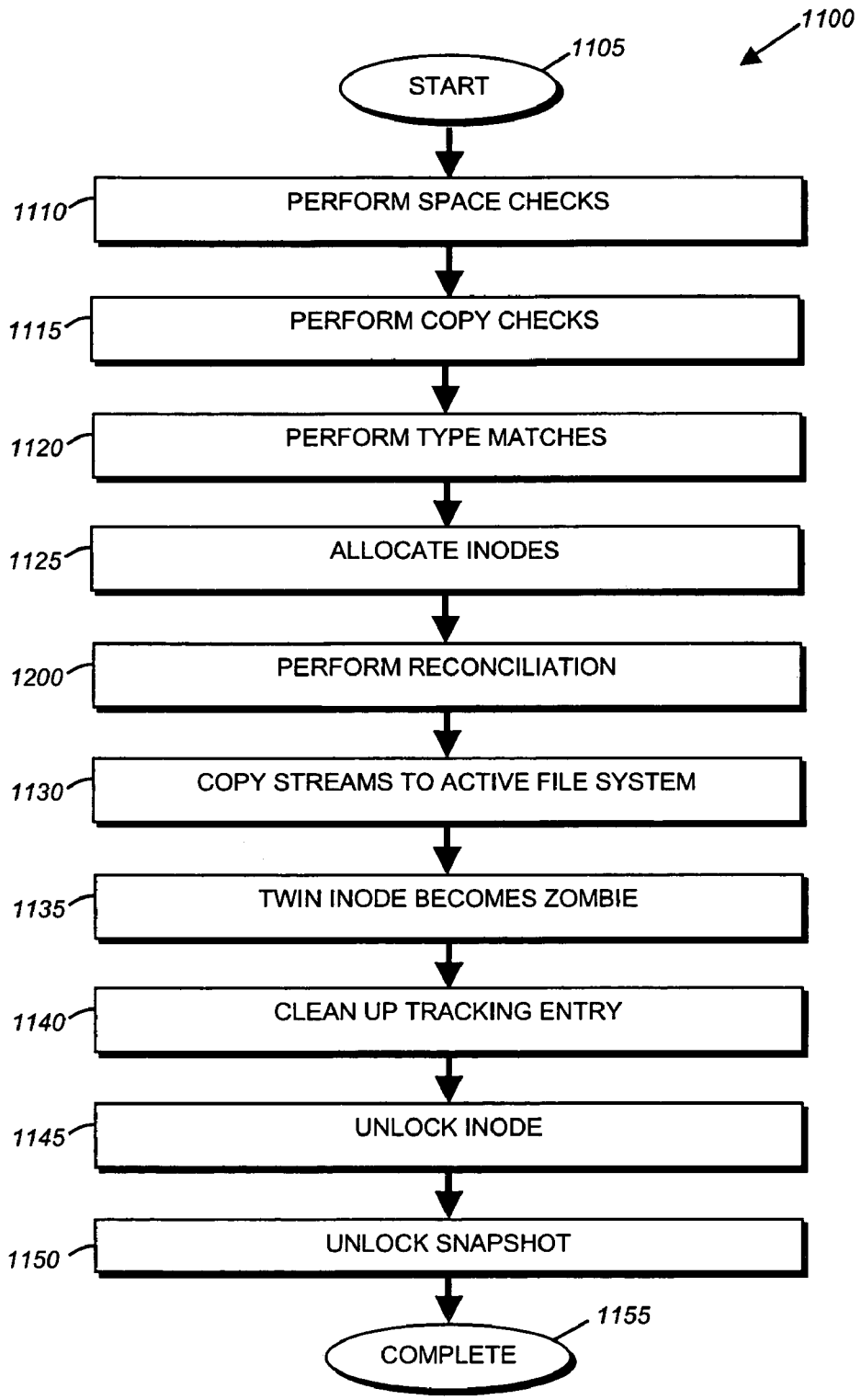
FIG. 11 is a flowchart detailing the steps of a procedure for restoring a single data stream file from a snapshot to an active file system.

The process performed by the restore process for a file that needs to undergo the above-referenced reconciliation process 1100 is shown in FIG. 11. The procedure begins in step 1105 and proceeds to step 1110, where the process performs a series of space checks. The space checks are to ensure that the newly created and restored file will fit within the active file system. While the process of the present invention typically requires little additional space in the active file system for files, there are several cases where substantial additional space is required. For example, if a file was 100 megabytes (MB) in size when the snapshot occurred, but since then has been edited so that it is only 1 MB in size, a restoration of the file results in some increased space within the active file system. This increase in space is still significantly smaller than used by conventional restore techniques. Next, the process performs a series of copy checks (step 1115). In step 1120, the restore process performs a type match. This type match ensures that, for example, no attempt is made to restore the file in the snapshot to a directory, or vice versa.

Next, in step 1125, an inode and associated buffer trees are allocated for use during the restoration process. The inode that is allocated is a new inode for the restored file in the active file system. Additionally, the buffer trees of the existing file are copied to a twin. This twin, thus, has a twin inode and associated buffer trees. The restore process 632 then proceeds to do the reconciliation process in step 1200. This reconciliation process walks through the buffer trees of the twin and the snapshot and generates the restored file. Then, in step 1130, the streams associated with the file are copied from the snapshot to the active file system. In step 1135, the twin inode is turned into a "zombie" inode. Zombie inodes are later processed by the file system layer. Such zombie processing is described in U.S. patent application Ser. No. 09/642,066, filed on Aug. 18, 2000, entitled MANIPULATION OF ZOMBIE FILES AND EVIL-TWIN FILES by Raymond C. Chen et al., now issued as U.S. Pat. No. 6,751,635 on Jun. 15, 2004, which is incorporated herein by reference. It should be noted that the use of zombie files is for illustrative purposes only. In alternate embodiments, the twin inode could simply be deleted or otherwise unallocated from the active file system. The tracking entry is then deleted by, for example, freeing memory or data structures associated with the tracking entry (step 1140). The newly created inode of the file system is then unlocked (step 1145). At this point the newly restored file is accessible by the active file system. In step 1150, the snapshot is unlocked. The procedure is then complete (step 1155).

Figure 12:
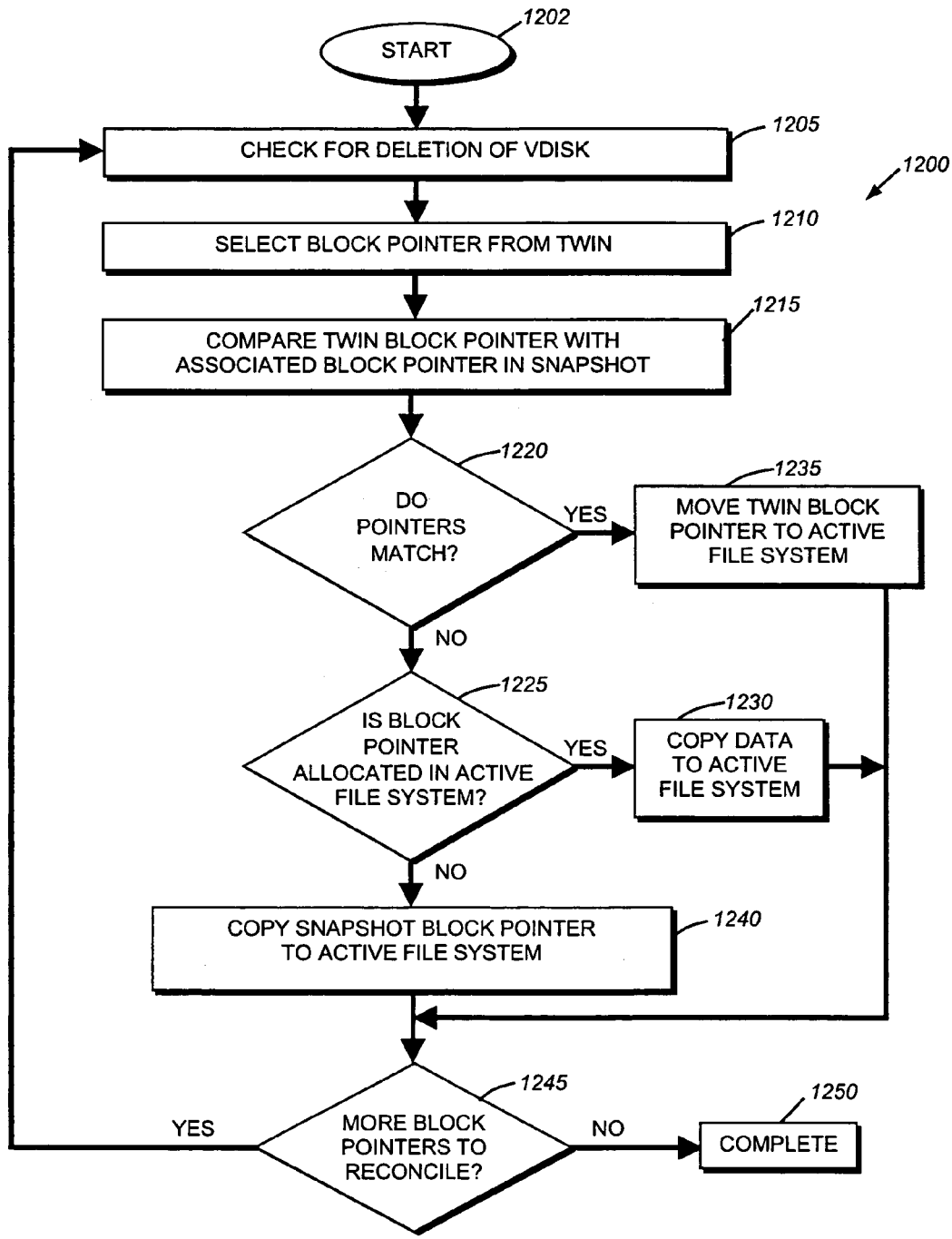
FIG. 12 is a flowchart detailing the steps of a procedure for performing a buffer tree reconciliation process in accordance with an embodiment of present invention.

The reconciliation process 1200 utilized by the restore process is shown in FIG. 12. The procedure begins in step 1202 and then checks for file deletion (step 1205). This check is to ensure that if a user deletes the file being restored, the file will be deleted and the restoration process will not proceed. The restore process then selects a block pointer from the twin (step 1210). The twin block pointer is then compared with the associated block pointer stored in the snapshot in step 1215. A determination is made, in step 1220 if the block pointers match. By match it is meant that the two block pointers point to the same data blocks. If the two block pointers do match, the block pointer from the twin is moved to the active file system in step 1235. If the block pointers do not match, a determination is made if the block that is pointed to by the block pointer is already allocated in the active file system (step 1225). If the block is already allocated, then the data from the block is copied to a new block in the active file system (step 1230). Otherwise, the block pointer from the snapshot is copied to the active file system (step 1240). Thus, if a particular block pointer has not been modified from the time of the snapshot to the time of file restoration, the block pointer from the associated twin, which is a copy of the block pointer stored in the active file system, is moved to the active file system. If the associated block pointer has been modified, a copy of the block pointer is generated from that stored in the snapshot and copied to the active file system if the block is not allocated in the active file system. Next, in step 1245, the restore process determines if there are more block pointers that need to be reconciled. If there are no more block pointers to reconcile, the reconciliation process 1200 is complete (step 1250) and the restore process 632 continues on in accordance with the procedure outlined in FIG. 11. If there are more block pointers to be reconciled, the process loops back to step 1205 and performs an additional deletion check. Throughout the reconciliation process 1200, the tracking entry is used to determine which blocks have been compared and which blocks need to be compared. In accordance with an alternate embodiment, multiple blocks can be compared at a time. For example, sixteen blocks can be read from the twin and compared with their associated snapshot blocks at a time. The use of multi-block comparison improves the performance of the reconciliation process.

To again summarize, upon the execution of the file restored process, which may be included in the file system layer or snapshot processes of a storage operating system, the snapshot and inodes are locked against access and a tracking entry is created. The file restore process then determines what type of file is being restored. If the file meets a predetermined or user-defined definition of a "small" file, then a conventional snapshot duplication technique can be utilized to restore the file. If the file has been deleted from the active file, then the restore process generates a buffer tree which points to the data block stored in the snapshot. Once this buffer tree is created, it is written to the active file system and any data streams are copied from the snapshot to the active file system to restore the file.

If the file exists in the active file system, then a reconciliation process occurs. After performing a series of verification operations, the restore process allocates a new inode for the restored file and creates a twin inode which contains the inodes associated with the file currently in the active file system. A reconciliation process is then performed whereby a block from the twin is compared to a block in the snapshot. If the blocks are equal, the block from the twin is moved to the active file system. If the blocks are not equal, the block from the snapshot is copied to the active file system. This reconciliation procedure proceeds until all blocks in the twin and snapshot have been compared. At the end of the reconciliation procedure, the twin only contains links and pointers to blocks, which have been modified since the time of the snapshot. The streams are then copied from the snapshot to the active file system. The twin inode is then turned into a zombie for later processing and deletion. This process thus significantly reduces the number of data blocks that need to be copied from the snapshot to the active file system. By reducing the number of data copies, file system space is saved and processing overhead is reduced.

More generally, the teachings of the present invention may be utilized with reference to any logical data container (LDC) embodied in a storage system having an active store and one or more reference stores. The term LDC generally refers to a unit of storage for holding data, such as a file or logical unit number (LUN), which is addressable by, e.g., its own unique identification. Thus, while the illustrative embodiment was written with reference to files contained within a file system, the teachings of the present invention may be implemented using any logical data container that includes appropriate data streams associated therewith. As noted above, an active file system is an illustrative embodiment of an active store, while a snapshot is an example of a reference store that is typically read-only.

The forgoing has been a detailed description of the illustrative embodiment of the invention. Various modifications and additions can be made without departing from the spirit and scope of the invention. For example, it is understood that the various data structures and inodes can include additional fields and/or be generated or managed by differing layers of a storage operating system while remaining within the scope of the present invention. Additionally, while this description has been written and referenced to file servers and filers, the principles are equally pertinent to all types of computers, including stand alone computers. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A method for restoring a file which has been deleted from a data storage system, comprising:
    determining if the file was deleted from an active file system of the data storage system;
    creating, in response to the deleted file having been deleted from the active file system, a set of twin pointers by copying from latest pointers in the active file system before the file was deleted;
    creating a new set of pointers;
    comparing a pointer from the twin pointers with a pointer from a snapshot of the active file system, the snapshot being a consistency point of the active file system at a time earlier than the deletion of the file;
    writing, in response to the pointer from the twin pointers pointing to a same data block as the pointer from the snapshot, the twin pointer into the new set of pointers;
    determining, in response to the pointer from the twin pointer not pointing to the same data block as the pointer from the snapshot, if the block pointed to by the twin pointer is allocated in the active file system;
    copying, if the block is allocated in the active file system, a data of the block to a new block in the active file system, to restore the file to data changed since the snapshot was taken;
    copying, if the block is not allocated in the active file system, pointers of the snapshot to the set of new pointers, to restore the file to data of the snapshot; and
    writing the new set of pointers into the active file system to restore the file to the active file system.

2. The method as in claim 1, further comprising:
    selecting another twin pointer to compare with the pointer from the snapshot; and
    repeating until all twin pointers are compared with the pointer from the snapshot.

3. The method as in claim 1, further comprising:
    determining if the file is a data stream file; and
    copying the data stream file from the snapshot to the active file system to restore the data stream file.

4. The method as in claim 1, further comprising:
    copying any metadata associated with the file to the active file system to restore the file to the active file system.

5. A data storage system, comprising:
    a procedure executing in a processor of the data storage system to restore a deleted file to an active file system of the data storage system, the procedure to do the following tasks;
    to determine if a file was deleted from an active file system;
    to create, in response to the deleted file having been deleted from the active file system, a set of twin pointers by copying from latest pointers in the active file system before the file was deleted;
    to create a new set of pointers;
    to compare a pointer from the twin pointers with a pointer from a snapshot of the active file system, the snapshot being a consistency point of the active file system at a 12 time earlier than the deletion of the file;
    to write, in response to the pointer from the twin pointers pointing to a same data block as the pointer from the snapshot, the twin pointer into the new set of pointers;
    to determine, in response to the pointer from the twin pointers not pointing to the same data block as the pointer from the snapshot, if the block pointed to by the twin pointer is allocated in the active file system;
    to copy, if the block is allocated in the active file system, a data of the block to a new block in the active file system, to restore the file to data changed since the snapshot was taken;
    to copy, if the block is not allocated in the active file system, pointers of the snapshot to the set of new pointers, to restore the file to data of the snapshot; and
    to write the new set of pointers into the active file system to restore the file to the active file system.

6. The system as in claim 5, further comprising:
    the procedure to select another twin pointer to compare with the pointer from the snapshot; and
    the procedure to repeat until all twin pointers are compared with the pointer from the snapshot.

7. The system as in claim 5, further comprising:
    the procedure to determine if the file is a data stream file; and
    the procedure to copy the data stream file from the snapshot to the active file system to restore the data stream file.

8. The system as in claim 5, further comprising:
    the procedure to copy any metadata associated with the file to the active file system to restore the file to the active file system.

9. A computer readable storage media, comprising:
said computer readable media containing instructions for execution on a processor for the practice of a method of restoring a file which has been deleted from a data storage system, the method having the steps of,
determining if the file was deleted from an active file system of the data storage system;
creating, in response to the deleted file having been deleted from the active file system, a set of twin pointers by copying from latest pointers in the active file system before the file was deleted;
creating a new set of pointers;
comparing a pointer from the twin pointers with a pointer from a snapshot of the active file system, the snapshot being a consistency point of the active file system at a time earlier than the deletion of the file;
writing, in response to the pointer from the twin pointers pointing to the same data block as the pointer from the snapshot, the twin pointer into the new set of pointers;
determining, in response to a pointer from the twin pointer not pointing to a same data block as the pointer from the snapshot, if the block pointed to by the twin pointer is allocated in the active file system;
copying, if the block is allocated in the active file system, a data of the block to a new block in the active file system, to restore the file to data changed since the snapshot was taken;
copying, if the block is not allocated in the active file system, pointers of the
writing the new set of pointers into the active file system to restore the file to the active file system.

10. A method for restoring a file which has been deleted from a data storage system, comprising:
determining if the file was deleted from an active file system of the data storage system;
determining if there is enough space in the active file system to hold a restoration of the file, and if there is proceeding with the restoration, and if there is not halting the restoration;
creating, in response to the deleted file having been deleted from the active file system, a set of twin pointers by copying from latest pointers in the active file system before the file was deleted;
creating a new set of pointers;
comparing a pointer from the twin pointers with a pointer from a snapshot of the active file system, the snapshot being a consistency point of the active file system at a time earlier than the deletion of the file;
writing, in response to the pointer from the twin pointers pointing to a same data block as the pointer from the snapshot, the twin pointer into the new set of pointers;
determining, in response to the pointer from the twin pointer not pointing to the same data block as the pointer from the snapshot, if the block pointed to by the twin pointer is allocated in the active file system;
copying, if the block is allocated in the active file system, a data of the block to a new block in the active file system, to restore the file to data changed since the snapshot was taken;
copying, if the block is not allocated in the active file system, pointers of the snapshot to the set of new pointers, to restore the file to data of the snapshot; and
writing the new set of pointers into the active file system to restore the file to the active file system.

11. The method as in claim 10, further comprising:
selecting another twin pointer to compare with the pointer from the snapshot; and
repeating until all twin pointers are compared with the pointer from the snapshot.

12. A data storage system, comprising:
a procedure executing in a processor of the data storage system to restore a deleted file to an active file system of the data storage system, the procedure to do the following tasks;
to determine if there is enough space in the active file system to hold a restoration of the file, and if there is proceeding with the restoration, and if there is not halting the restoration;
to determine if a file was deleted from an active file system;
to create, in response to the deleted file having been deleted from the active file system, a set of twin pointers by copying from latest pointers in the active file system before the file was deleted;
to create a new set of pointers;
to compare a pointer from the twin pointers with a pointer from a snapshot of the active file system, the snapshot being a consistency point of the active file system at a time earlier than the deletion of the file;
to write, in response to the pointer from the twin pointers pointing to a same data block as the pointer from the snapshot, the twin pointer into the new set of pointers;
to determine, in response to the pointer from the twin pointers not pointing to the same data block as the pointer from the snapshot, if the block pointed to by the twin pointer is allocated in the active file system;
to copy, if the block is allocated in the active file system, a data of the block to a new block in the active file system, to restore the file to data changed since the snapshot was taken;
to copy, if the block is not allocated in the active file system, pointers of the snapshot to the set of new pointers, to restore the file to data of the snapshot; and
to write the new set of pointers into the active file system to restore the file to the active file system.

13. The system as in claim 12, further comprising:
the procedure to select another twin pointer to compare with the pointer from the snapshot; and
the procedure to repeat until all twin pointers are compared with the pointer from the snapshot.

14. A computer readable storage media, comprising:
said computer readable storage media containing instructions for execution on a processor for a method of restoring a file which has been deleted from a data storage system, having,
determining if the file was deleted from an active file system of the data storage system;
determining if there is enough space in the active file system to hold a restoration of the file, and if there is proceeding with the restoration, and if there is not halting the restoration;
creating, in response to the deleted file having been deleted from the active file system, a set of twin pointers by copying from latest pointers in the active file system before the file was deleted;
creating a new set of pointers;
comparing a pointer from the twin pointers with a pointer from a snapshot of the active file system, the snapshot being a consistency point of the active file system at a time earlier than the deletion of the file;
writing, in response to the pointer from the twin pointers pointing to a same data block as the pointer from the snapshot, the twin pointer into the new set of pointers;

determining, in response to the pointer from the twin pointer not pointing to the same data block as the pointer from the snapshot, if the block pointed to by the twin pointer is allocated in the active file system;

copying, if the block is allocated in the active file system, a data of the block to a new block in the active file system, to restore the file to data changed since the snapshot was taken;

copying, if the block is not allocated in the active file system, pointers of the snapshot to the set of new pointers, to restore the file to data of the snapshot; and writing the new set of pointers into the active file system to restore the file to the active file system.

* * * * *

UNITED STATES PATENT AND TRADEMARK OFFICE
CERTIFICATE OF CORRECTION

| | | |
|---|---|---|
| PATENT NO. | : 8,010,503 B1 | Page 1 of 1 |
| APPLICATION NO. | : 11/650768 | |
| DATED | : August 30, 2011 | |
| INVENTOR(S) | : Raymond C. Chen | |

It is certified that error appears in the above-identified patent and that said Letters Patent is hereby corrected as shown below:

In Col. 16, line 36 should read:
being a consistency point of the active file system at ~~a 12~~

In Col. 17, line 29 should read:
system, pointers of the snapshot to the set of new pointers, to restore the file to data of the snapshot; and Signed and Sealed this
First Day of May, 2012

David J. Kappos
*Director of the United States Patent and Trademark Office*